United States Patent Office 3,436,314
Patented Apr. 1, 1969

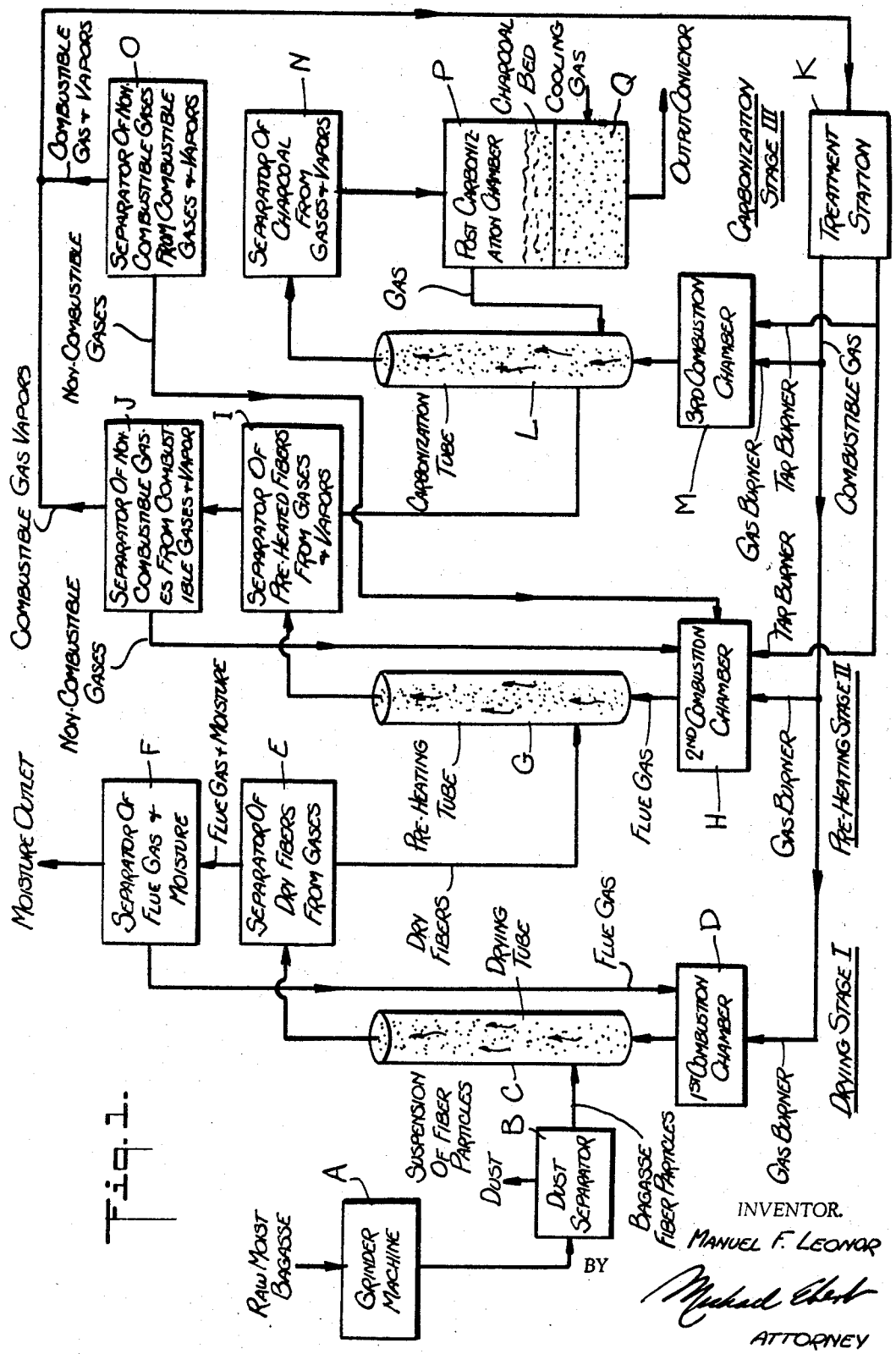

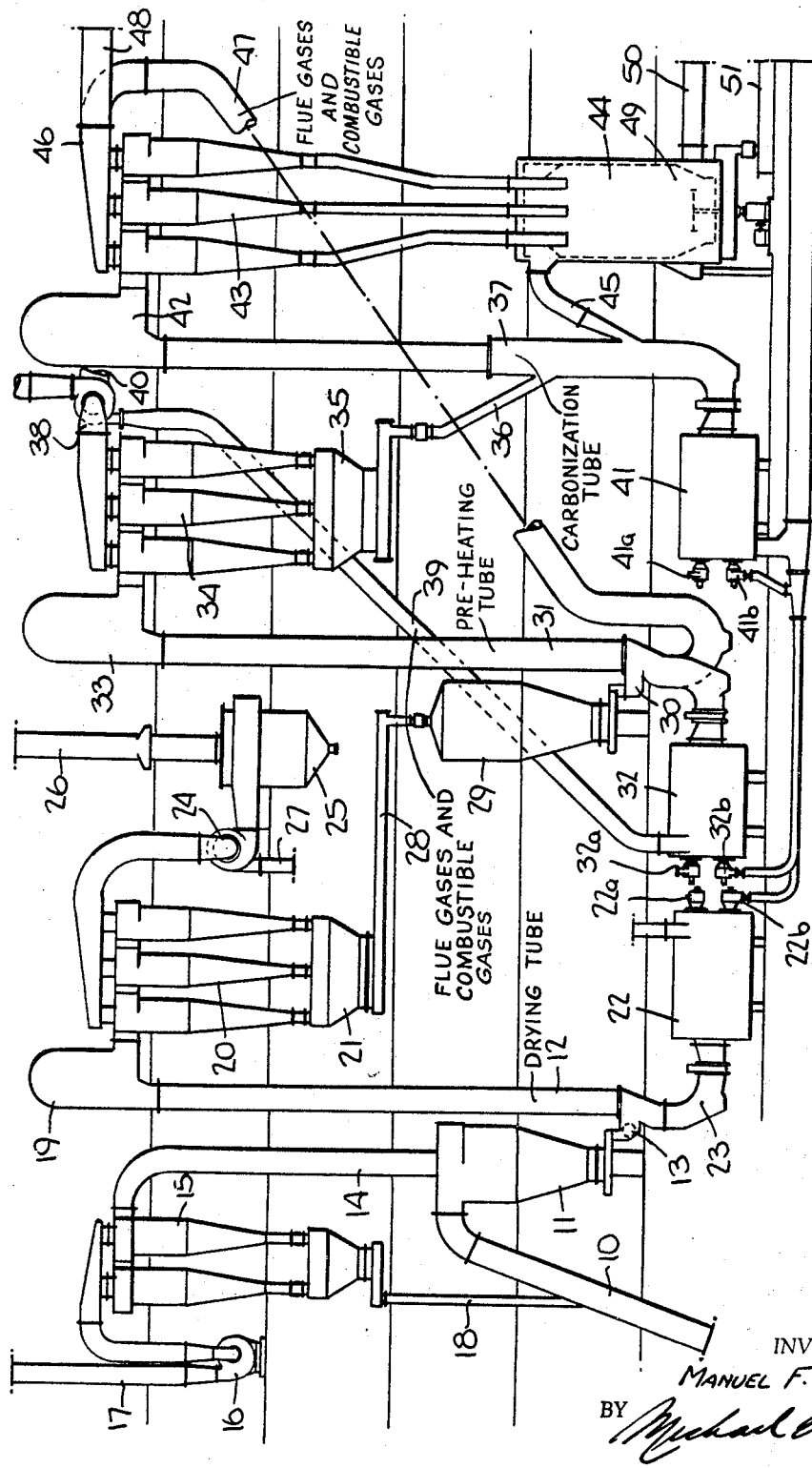

3,436,314
TECHNIQUE FOR CONVERTING BAGASSE AND OTHER MOIST PLANT SUBSTANCES INTO CHARCOAL
Manuel F. Leonor, 509 W. 122nd St., New York, N.Y. 10027
Filed July 23, 1964, Ser. No. 384,710
Int. Cl. C10b 57/10, 57/02
U.S. Cl. 202—117  6 Claims

ABSTRACT OF THE DISCLOSURE

A system for converting moist plant matter into charcoal, wherein the matter in particulate form is introduced in a suspended state into a drying tube supplied with a flue gas to dry the particles, the dried particles being introduced in a suspended state into a preheating tube supplied with a flue gas for heating the particles to a temperature effecting partial carbonization thereof to produce heated, partially-carbonized particles which are then introduced in a suspended state into a carbonization tube supplied with a flue gas heating the particles to a temperature effecting complete carbonization thereof.

---

This invention relates generally to the production of charcoal, and more particularly to a technique for converting waste plant and vegetable material having a high moisture content into charcoal of high quality in a continuous autothermic operation which is rapid, efficient and economical.

The production of charcoal involves the incomplete combustion of organic plant matter, such as wood. When wood is heated to a temperature of 250° C. or higher, it decomposes to form gases, vapors and solids. The complete combustion of wood gives rise to a useless ash residue, but if the air supply is restricted, in the resultant incomplete combustion, a solid charcoal residue remains after the volatile elements are driven off as smoke.

The smoke created by incomplete combustion is constituted by non-condensable gases and condensable vapors. The principal gases evolved are carbon monoxide and dioxide, hydrogen, oxygen, nitrogen and methane. The vapors are water acids, alcohols, tars, oils and other organic compounds. Carbon monoxide, hydrogen and methane are combustible, whereas the other gases emitted are non-combustible. Well burned charcoal contains about 75% to 95% carbon plus a small amount of ash derived from inorganic minerals in the wood or other plant material being converted.

While many devices have been developed to convert wood into charcoal, these devices generally fall within four main classes. In the first class, carbonization is effected by the admission of air to wood, the air supply being restricted. In the second class, hot furnace gases are circulated throughout the wood mass, the gases containing only a small amount of oxygen. In the third class, heat is applied to the outside of a sealed container in which the wood is enclosed, while in the fourth class, carbonization takes place in heavily insulated chambers through which the wood is passed continuously through an exothermic zone.

The methods falling within the first two classes involve the use of a kiln, and these methods are intended primarily for the production of charcoal, the volatile elements being usually wasted. In the third and fourth classes, a retort or oven is used, the arrangement being designed to recover the condensable acids, tars, etc., the charcoal production being of incidental importance. Other methods are also known which do not fall into these four classes, such as fluid-bed processes especially adapted to convert sawmill wood waste into charcoal.

None of the existing charcoal production methods lends itself effectively to the conversion into charcoal of plant and vegetable materials having a high water content, such as corn stalks, cane trash, coffee bean waste, peat moss, begasse and alcohol slop, as well as olive pulp and similar organic waste materials. While the present invention is not limited to bagasse, this waste material, because of its cheapness and availability in enormous quantities is of particular interest.

In the manufacture of sugar from sugar cane, the crushed fibers from which the sap has been expressed are called "bagasse." At present its principal use is as a fuel to run the mills which crush the cane, in which connection it is mixed with petroleum oil. It is also used to a limited extent as fertilizer and in manufacturing insulation board and coarse paper. But since sugar cane is grown in various parts of the world and the international demand for sugar has sharply increased in recent years, vast quantities of bagasse are currently being wasted or inadequately exploited.

While the organic nature of bagasse is similar to that of wood, its moisture content which runs between 45% to 50 and higher, creates a special problem when seeking to convert this material into charcoal of good quality.

Accordingly, it is the primary object of this invention to provide a method and system for converting bagasse and other organic waste products having a relatively high moisture content, into charcoal.

More specifically, it is an object of this invention to provide a high-yield technique wherein the raw bagasse is converted into charcoal in a continuous autothermic operation wherein the heating fuel producing flue gases for drying the bagasse and for transforming the bagasse into charcoal is derived from distillation products such as gas, tar and methanol resulting from the conversion process, without any extraneous supply of fuel beyond that necessary to initiate the operation.

One salient feature of the invention resides in the fact that the system is composed of three stages wherein moist bagasse particles are first dried, then preheated almost to the point of decomposition, and finally carbonized, these actions being carried out while the particles are dispersed in a suspension facilitating direct heat transfer and the uniform conversion of the particles into charcoal.

Also an object of the invention is to provide a continuous system of the above-described type, which operates efficiently, reliably and economically to rapidly convert raw, moist bagasse or similar material into charcoal. A significant advantage of the invention is that since the heating fuel for carrying out the various process steps is furnished by the bagasse, the cost of conversion per pound of charcoal is exceptionally low, even when the cost of the system is amortized over a relatively short period.

Thus it becomes feasible to erect systems in accordance with the invention at sites such as the Philippines, the Caribbean islands, and all other sugar-growing areas where bagasse is available in concentrated quantities as a waste product, and to ship the charcoal to remote points. Because of the economies of such charcoal production, charcoal can be made available at low cost to thereby satisfy the strong industrial and domestic demand for the material, without depleting forest resources.

Also an object of the invention is to provide a system for converting bagasse into charcoal and for simultaneously extracting valuable by-products therefrom.

Another important advantage of the invention is that the parameters of the system are readily controllable to vary the density, carbon content and other charcoal properties, thereby providing a charcoal product meeting any desired specification.

For a better understanding of the invention as well as other objects and features thereof, reference is made to the following detailed description to be read in connection with the accompanying drawing, wherein:

FIG. 1 is a simplified block diagram of a system in accordance with the invention; and FIG. 2 illustrates schematically an actual embodiment of the system.

Referring now to FIG. 1, we shall discuss the principles underlying the invention in connection with the conversion of moist bagasse into charcoal. It is to be understood, however, that the invention is fully applicable to many other moist cellulosic organic materials such as peat moss. Bagasse is, as noted previously, a solid fibrous residue from the milling of cane, and it has a moisture content as high as 55%. The first step in the continuous process involves grinding of the bagasse in a suitable grinding machine A to form particles thereof. This grinding is necessary in order to produce particles which can be uniformly dispersed in a gaseous medium, this being an important aspect of the invention.

These particles inevitably contain very fine dust or bagacillo, which are preferably removed in a mechanical dust separator B. The dust-free particles are conveyed pneumatically through the system in the suspended state and are first introduced into a vertically-mounted drying tube C. The suspension of bagasse particles in tube C is subjected to a stream of flue gas emitted from a first combustion chamber D. The temperature in the drying tube is in the range of about 30° C. to 80° C., which is sufficient to volatilize most of the water contained in the bagasse, leaving a moisture residue of 6% or less.

The flue gas flowing through drying tube C, as well as the heated suspension of particles and the moisture resulting from evaporation of the water content of the bagasse, are conducted into a separator E, which may be a cyclonic or other suitable device for this purpose. Separator E acts to precipitate the dried particles from the flue gases and the evolved moisture. The segregated flue gases and moisture are conveyed into a separator F which discharges the moisture into the atmosphere, while passing the hot flue gases back into the first combustion chamber D for recirculation in the drying tube C, thereby conserving the available heat.

The dried particles precipitated in separator E are conveyed by a screw conveyor or other means which may include a buffer container, into a second vertical tube G, where again they are brought into a suspended state, this time for the purpose of preheating the particles in the range of about 80° C. to 200° C., almost to the point of decomposition to condition the particles for subsequent full carbonization. Such heating is effected by flue gases generated in a second combustion chamber H.

In the preheater stage, the bagasse loses about 25% of its mass to produce incomplete combustion products in the form of combustible and non-combustible gas and vapors. These gaseous and vapor products, as well as the hot particles and the flue gas, all of which appear in the output of the preheating tube G, are fed to a solid-fluid separator I, which precipitates the particles while passing the gases and vapors to a fluid separator J.

Separator J segregates the flue gases and the non-combustible gases generated in the preheating tube from the combustible gases and vapors, the flue gases and non-combustible gases being conducted to the second combustion chamber H for recycling. The combustible gases and vapors are fed to a treatment or by-product extraction device K, to be later described, which extracts the combustible gases and tars for the purpose of fueling the combustion chambers.

The preheated particles precipitated in separator I in the second stage of the system are conveyed to a final heating tube L in the third stage, where the particles in a suspended state, are subjected to flue gas emitted from a third combustion chamber M. Here the temperature is in the range of 200° C. to 450° C., this increase in temperature resulting from the exothermic heat created by the carbonization process.

The resultant charcoal particles, the non-combustible and combustible gases and vapors resulting from carbonization, as well as the non-combustible flue gases, are all fed into a separator N which precipitates the charcoal particles and feeds the gases and vapors into a fluid separator O. This separator passes the non-combustible gases into the second combustion chamber H for recirculation, while feeding the combustible gases and vapors to treatment device K.

The hot carbonized particles are conveyed from the separator N into a post-carbonization settling chamber P when the temperature of the particles in the resultant bed thereof is equalized and the charcoal assumes a uniform quality throughout its mass. Hot gas emitted from the charcoal bed in chamber P is fed into the carbonization tube L for recirculation. The hot charcoal is then discharged into a cooling zone Q where it is subjected to a cooling gas to cause a reduction in temperature in the range of 70° C. to 80° C., after which the cooled charcoal is removed by means of an output conveyor.

The combustible gases and condensible vapors derived from the preheating and carbonization stages, are fed to the treatment station K and separated into acids, tars and gases. This separation is carried out by scrubbers, fluid filtration devices and other well known means to separate tars from gases, and to segregate different types of gases. The tars and the combustible gases are supplied by suitable pipes to the second and third combustion chambers H and M to provide heating fuel therefor, the gas also being supplied to the first combustion chamber to provide heating fuel therefor.

The tars, acids and other distillation products extracted at the treatment station simultaneously with the production of charcoal, are in excess of the fuel demand of the conversion system and hence provide valuable by-products.

The operation of the system is initiated by an outside supply of oil to the burners of the first and second combustion chambers until such time as sufficient tars and combustion gases are generated by the conversion process to bring about an autothermic, self-sufficient operation in which the heat requirements for transforming the moist bagasse are met without any external supply of heating fuel.

Referring now to FIG. 2, an actual and practical embodiment of the invention is disclosed, operating on the same principles described in connection with FIG. 1. The moist bagasse particles obtained from the grinder are fed into a pneumatic tube 10 which leads them into a hopper 11 whose output is fed into the lower end of a vertically mounted drying tube 12 through a suction device 13 in the form of a blower fan or the like. The upper end of hopper 11 is coupled by an air pipe 14 to a cyclonic dust separator 15, which in turn is coupled by a suction device 16 to a chimney pipe 17 leading to the atmosphere.

The relative suction forces created by suction devices 13 and 16 are such that the heavier particles of bagasse are drawn into the drying pipe 12, whereas the lighter particles or dust are carried upwardly and discharged through pipe 17 into the atmosphere. However, those heavier particles which are also drawn upwardly are precipitated by device 15 are returned to the pneumatic input tube 10 through feedback pipe 18.

The airborne particles fed into drying tube 12 are drawn upwardly therein in the suspended state, the particles then entering the hooded dome 19 from which they pass into the cyclonic separator 20 which acts to precipitate the dried particles into a collector 21. The suspension of particles in tube 12 is heated by a stream of flue gas emitted from the first combustion chamber 22 coupled to the lower end of the drying tube through a duct 23.

The hot flue gas separated from the dried particles in separator 20 as well as the moisture evaporated from the particles, are drawn through a suction device 24 and a cyclonic washer 25, the moisture being discharged into the atmosphere through an air pipe 26. The flue gas taken from separator 20 is returned to the first combustion chamber through pipe 27 for recirculation in the drying tube.

The dried particles in collector 21 are fed by a screw conveyor 28 or equivalent means into a storage container 29, from which they are supplied through a distributor 30 into the lower end of the vertically-mounted preheating tube 31 into which tube is also supplied flue gas produced in a second combustion chamber 32. The upper end of the tube 31 is coupled through hood 33 into a cyclonic separator 34 which precipitates the preheated particles and deposits them in a collector 35 from which they are transported through a feed pipe 36 into the carbonization tube 37.

The flue gases and non-combustible gases derived from separator 34 are segregated by device 38 from the combustible gases and vapors arising from the preheating process, the flue gases and non-combustible gases being fed by pipe 39 into the second combustion chamber 32 for recirculation. The combustible gases and vapors are fed to a treatment station (not shown in this figure) through duct 40.

A third combustion chamber 41 is provided, coupled to the final heating tube 37 to effect carbonization of the preheated particles suspended therein. The carbonized particles are fed through hood 42 into cyclonic separator 43, the precipitated particles being deposited into a lined carbonization chamber 44. Gas evolved from this chamber is fed through duct 45 into the input of the carbonization tube 37 for recirculation.

By means of separator 46, the non-combustible gases and flue gas derived from separator 43 are fed into the second combustion chamber 32 through duct 47, whereas the vapors and combustible gases go to the treatment station through duct 48. In the chamber 44, the heated charcoal is cooled in zone 49 by means of cooling fluid introduced through pipe 50. The cooled charcoal is taken out by means of a conveyor 51.

The three combustion chambers 22, 32 and 41 are provided with tar or oil and gas burners 22a and 22b, 32a and 32b, and 41a and 41b, respectively. Tar and gas derived from the incomplete combustion of the bagasse and extracted at the treatment station is fed to the appropriate burners, except that because of the more limited heat requirements of the first chamber 22, no tar is supplied thereto. As pointed out previously, until such time as the system can generate its own fuel, an external source of oil is used to start up the conversion system, no external oil being needed once the exothermic process takes place.

Thus the system is autothermic and derives the fuel necessary to effect conversion, from the smoke produced in the course of incomplete combustion. Since the particle size of the bagasse, the heating temperature range and the amount of air intermingled with the particles, and all other factors involved in the production of the charcoal, are controllable in the three stages of the system, charcoal of good quality can be produced to meet any acceptable specifications. Moreover, since the particles are dispersed in a suspended state when undergoing treatment, the resultant charcoal is of uniform quality throughout its mass.

It is to be understood that while the invention has particular advantages in connection with plant and vegetable matter having a relatively high moisture content, it is also of value in the conversion of materials such as wood having a lower moisture content. In the case of wood, this material is first ground into particles of sawdust before it is fed into the three stages of the system. Of course where sawdust is available as a waste product, the grinding or shredding step is not necessary.

While there has been shown and described a preferred embodiment of technique for converting bagasse into charcoal in accordance with the invention, it will be appreciated that many changes and modifications may be made therein without, however, departing from the essential spirit of the invention as defined in the annexed claims.

What I claim is:

1. A system to convert moist plant matter into charcoal, comprising:
    (A) a drying tube,
    (B) a preheating tube,
    (C) a carbonization tube,
    (D) means including a hopper for introducing said moist matter in particulate form in suspended state into said drying tube, and a cyclonic dust separator coupled to said hopper to withdraw air-borne particles therefrom and to discharge the lighter particles into the atmosphere while returning the heavier particles to the hopper,
    (E) a first combustion chamber coupled to said drying tube to supply flue gas thereto to heat the particles fed therein to a relatively low temperature effecting drying thereof,
    (F) means introducing the dried particles in suspended state into said preheating tube,
    (G) a second combustion chamber coupled to said preheating tube to supply flue gas thereto to heat the dried particles fed therein to a higher temperature effecting partial carbonization thereof,
    (H) means introducing the partially carbonized particles in suspended state into said carbonization tube,
    (I) a third combustion chamber coupled to said carbonization tube to supply flue gas thereto to heat the partially carbonized particles fed therein to a still higher temperature effecting full carbonization thereof,
    (J) means including respective cyclonic separators coupled to said pre-heating and carbonization tubes to separate the smoke generated by heating of the particles therein and to extract combustible components from said smoke, and
    (K) means to supply said combustible components to said second and third chambers to be burned therein to produce said flue gases.

2. A system as set forth in claim 1, further including means coupled to said drying tube to separate the moisture and the flue gas from the dried particles, and means to recirculate said flue gas and to dispense with said moisture.

3. A system as set forth in claim 1, further including a chamber for receiving charcoal particles from said carbonization tube, and means for returning heated gas evolved in said chamber to said carbonization tube.

4. A system as set forth in claim 1, further including means coupled to said preheating tube for separating the heated particles from non-combustible and flue gases, and means to circulate these gases in the preheating tube.

5. A system as set forth in claim 1, further including a treatment station coupled to said preheating and carbonization tubes to separate combustible products derived from the smoke emitted in the tubes into tar and combustible gas, and means to supply a portion of said tar and combustible gas to said combustion chambers to be burned therein to produce said flue gases.

6. A system as set forth in claim 1, wherein said moist plant matter has a water content of between 40 and 55%.

References Cited

UNITED STATES PATENTS

| | | | |
|---|---|---|---|
| 2,406,509 | 8/1946 | Claes-Wilhelm Pilo | 201—25 |
| 2,773,018 | 12/1956 | Parry | 201—31 |
| 3,011,953 | 12/1961 | Foch | 201—15 |
| 3,298,928 | 1/1967 | Esterer | 201—31 |

NORMAN YUDKOFF, *Primary Examiner.*

D. EDWARDS, *Assistant Examiner.*

U.S. Cl. X.R.

201—25, 31, 37; 202—121